United States Patent [19]

Fuhrman et al.

[11] 4,081,262

[45] Mar. 28, 1978

[54] USE OF REDUCING GAS CURTAIN FOR START OF GLASS FORMING PROCESS

[75] Inventors: Philip K. Fuhrman, Freeport; Robert A. Greiner, Jr., Tarentum, both of Pa.

[73] Assignee: PPG Industries, Inc., Pittsburgh, Pa.

[21] Appl. No.: 821,451

[22] Filed: Aug. 3, 1977

[51] Int. Cl.² ............................................. C03B 18/02
[52] U.S. Cl. ........................................ 65/65 A; 65/32; 65/99 A; 65/182 R
[58] Field of Search ............... 65/65 A, 99 A, 182 R, 65/32

[56] References Cited

U.S. PATENT DOCUMENTS

| | | | |
|---|---|---|---|
| 3,241,937 | 3/1966 | Michalik et al. | 65/65 A X |
| 3,337,322 | 8/1967 | Taylor | 65/99 A X |
| 3,551,126 | 12/1970 | Sacrez et al. | 65/32 X |

Primary Examiner—Arthur D. Kellogg
Attorney, Agent, or Firm—E. Kears Pollock

[57] ABSTRACT

A curtain of reducing gas is established across the entrance end of a glass forming chamber which employs a pool of molten metal to support glass during forming in order to impinge reducing gas along a line across a refractory delivery piece and molten metal region of the forming chamber in order to insure that molten glass is initially delivered onto molten tin free of contaminants, such as metal oxide.

6 Claims, 4 Drawing Figures

USE OF REDUCING GAS CURTAIN FOR START OF GLASS FORMING PROCESS

BACKGROUND OF THE INVENTION

1. Field of the Invention

This invention relates to the manufacture of flat glass according to a process in which molten glass is delivered along a delivery facility and onto the surface of a pool of molten metal which supports it during forming. More particularly, this invention relates to a method for initiating such a process and establishing an initial body of glass on molten metal in a forming chamber when a forming chamber is operated for the first time or following periods of shutdown.

2. Brief Description of the Prior Art

It is well known that following the construction of a new glassmaking facility employing a forming chamber that the forming chamber and its associated equipment must be initially heated to a temperature within a suitable range for receiving molten glass for forming prior to the manufacture of flat glass by such a process in the forming chamber. It is also well known that following periods of shutdown, either for maintenance or otherwise, it is necessary to re-establish desired thermal conditions within a forming chamber and its attendant molten glass delivery facilities prior to commencing the manufacture of flat glass therein. In addition to initially establishing desired thermal conditions within a forming chamber, it is also known to be necessary to establish desirable non-oxidizing conditions within a chamber employing molten metal as a glass support. Otherwise, molten metal upon which glass is to be supported in such a process will oxidize. During steady state operation that is established following an initial startup period, it is known that maintenance of a non-oxidizing atmosphere within such a glass forming chamber is essential. The following patents disclose the introduction of non-oxidizing or reducing gases into an enclosed chamber in which flat glass is to be formed by floating molten glass on molten metal and thereafter cooling the glass sufficiently to form it into a dimensionally sheet of flat glass.

U.S. Pat. No. 1,553,773 discloses the introduction of nitrogen to provide a non-oxidizing atmosphere or environment in which flat glass is to be formed by a float method.

U.S. Pat. No. 2,911,759 discloses the use of coal gas as a non-oxidizing atmosphere for a float process. Coal gas, of course, contains methane and hydrogen as reducing agents.

U.S. Pat. No. 3,241,937 discloses use of a mixture of nitrogen and hydrogen (93 percent nitrogen and 7 percent hydrogen) as an atmosphere for a float process. This patent additionally shows the introduction of atmosphere gas into the glass forming chamber along a line transverse the entrance portion of the forming chamber as seen along section line 5—5 in FIG. 1 of this patent.

Initially, during the startup procedure to ready a flat glass forming chamber for receiving molten glass, it is common to establish a heating schedule which provides for increasing the temperature of the forming chamber from the outside ambient temperature to a temperature of from 900° to 1500° F. (480° to 820° C.) over a period of several days and to purge the interior of the forming chamber with a reducing gas, particularly toward the end of the heating schedule when the temperature is above 500° to 600° F. (260° to 320° C.). Meanwhile, it is common to add tin metal to the forming chamber so that it melts to form a pool of molten metal during the period of heating the chamber. When the chamber has reached a suitable temperature within the suggested range, the forming chamber is commonly allowed to soak at that temperature while reducing gas is fed to the chamber and the condition of the molten metal is observed.

Initially, the molten metal commonly has metal oxide floating on its surface. Metal oxide is referred to as dross. After a period of soaking at the high temperature, the metal oxide is reduced. In some instances it is found expedient to draw the floating dross or metal oxide mechanically from the surface of the molten metal and to physically remove it as a solidified dross from the chamber. During heatup it is a common problem to encounter excessive metal oxide in the vicinity of the refractory portions of molten glass delivery facility which extend into the inlet end of the forming chamber and it is not uncommon to encounter some contamination of such refractory pieces by metal oxide which adheres strongly to the surfaces. Various expedients have been attempted to isolate the inlet end of a forming chamber from the remaining portions of a forming chamber during heatup in order to minimize the contamination of such refractory pieces with metal oxide. For example, curtains and other of refractory materials and plates of refractory materials and metal have been employed to physically segregate the entrance end of a forming chamber from the remainder of the forming chamber during heatup. It has been an objective to find a suitable means for isolating the entrance or inlet end of a forming chamber from the remainder of the chamber during heatup, which means may be expediently removed after the initiation of molten glass flow into the chamber. It is also desired to provide for positively maintaining the cleanliness of the inlet end of the forming chamber prior to the introduction of molten glass into it. The present invention is believed to provide a method for accomplishing these objectives.

SUMMARY OF THE INVENTION

A method is provided for preparing a glass forming chamber to receive molten glass onto a pool of molten metal, such as tin, contained in the chamber. The method is an adaptation or improvement upon known methods for heating and starting operation of a flat glass forming process wherein molten glass is to be delivered onto the surface of a pool of molten metal, such as tin or an alloy of tin, contained in an enclosed chamber. Such a chamber is provided with an opening or headspace above the pool of molten metal which is filled with a non-oxidizing gas or gases as a protective atmosphere. The basic heatup method provides for heating the pool of tin-containing metal to melt the metal and maintaining the headspace in the enclosed chamber filled with a non-oxidizing gaseous atmosphere to prevent the oxidation of the metal. Typically, there is residual oxygen in the chamber as the heatup and startup procedure is initiated, and typically metal oxide is to be expected in the chamber as the metal is melted.

In accordance with this invention a curtain of reducing gas is established transversely across the inlet end of the forming chamber. The curtain of reducing gas is established immediately above a molten glass-supporting refractory, such as a spout, lip or threshold adjacent the metal onto which molten glass is to be delivered.

The curtain of reducing gas is maintained as the metal is melted and as molten glass is initially delivered onto the molten metal. The curtain is maintained in such a manner so as to provide a stream of reducing gas impinging onto the molten metal surface along a line extending across the width of the forming chamber adjacent to the glass-supporting refractory and spaced as closely to it as practical. After molten glass is initially delivered onto the molten metal, the curtain of reducing gas is terminated to prevent the continuing direct impingement of gas against the molten glass. This is done so as to avoid causing indentations and imperfections in the surface of molten glass which will ultimately be cooled and attenuated to form a dimensionally stable, continuous sheet or ribbon of glass.

The curtain of reducing gas is directed to impinge upon the molten metal with sufficient force to move any metal oxide floating on the molten metal surface away from the glass-supporting refractory. The orientation of the curtain or reducing gas is such as to provide for a slight angular displacement of the gas as it descends into contact with the molten metal. Additional streams or curtains of reducing gas may be directed along paths having differing orientations such as in a direction toward the refractory piece but a stream of reducing gas sufficient in force and orientation to move any metal oxide floating on the molten metal surface away from the glass-supporting refractory is preferred as an effective method of purging the region of molten glass delivery.

Reducing gas preferably contains one to two percent by volume hydrogen although it may contain considerably more hydrogen and may contain other reducing gases, such as methane, in addition to hydrogen. In a particularly preferred method, the reducing gas contains nitrogen as a major constituent. In particular, nitrogen may be present as a major constituent of from 50 to 99 percent nitrogen.

In a preferred embodiment of this invention, a curtain of reducing gas is directed to impinge upon the molten metal with sufficient force to establish a wave action in the molten metal, causing the molten metal at the surface of the pool to flow away from the glass-supporting refractory. Such a wave action is suitable for mixing the molten metal and enhancing the rate at which any oxygen entrapped in refractories comprising the bottom of the forming chamber may be reacted and discharged and removed from the forming chamber prior to beginning the delivery of molten glass into the forming chamber.

In accordance with preferred embodiments of this invention, a second curtain of reducing gas is established transversely across the inlet end of the forming chamber. The gas of this curtain of reducing gas is directed to impinge against the glass-supporting refractory and this curtain of reducing gas is located between a metering member which holds back the molten glass prior to its initial delivery onto the surface of the molten metal and the first curtain of reducing gas previously described. This curtain of reducing gas serves to blanket the refractory with reducing gas and to sufficiently pressurize the region between the glass metering member which holds back the molten glass prior to startup and the pool of molten metal to prevent any substantial spattering of molten metal onto the refractory itself. This invention may be further appreciated with reference to the drawings.

BRIEF DESCRIPTION OF THE PREFERRED EMBODIMENTS

Figure 1:
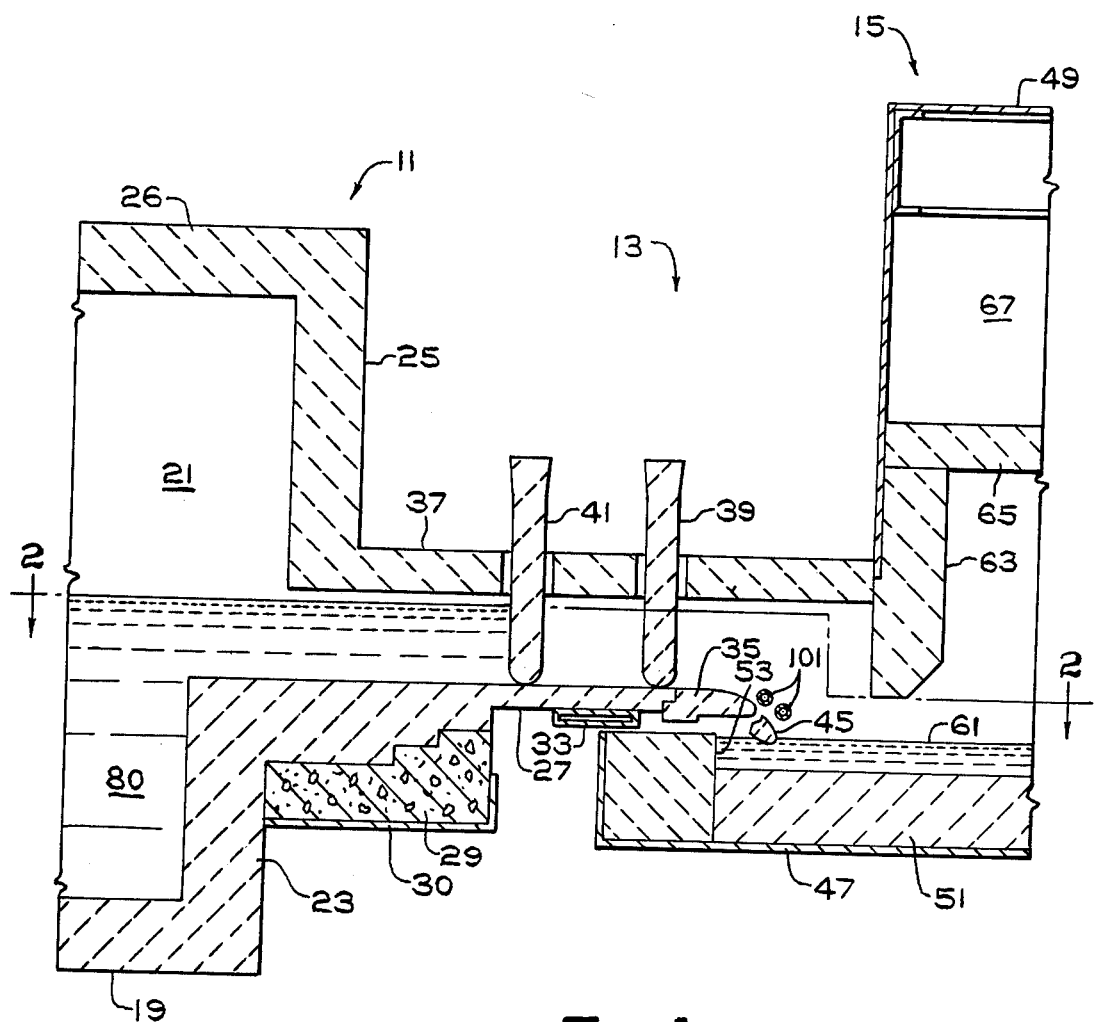
FIG. 1 is a cross-sectional, longitudinal elevation of a molten glass delivery facility joining the discharge or exit end of a glassmaking furnace and the inlet or entrance end of a glass forming chamber illustrating the positioning of reducing gas distributors for establishing and maintaining curtains of reducing gas across the inlet end of the forming chamber during heatup of the chamber and during the initial period of molten glass delivery to the forming chamber.
Figure 2:
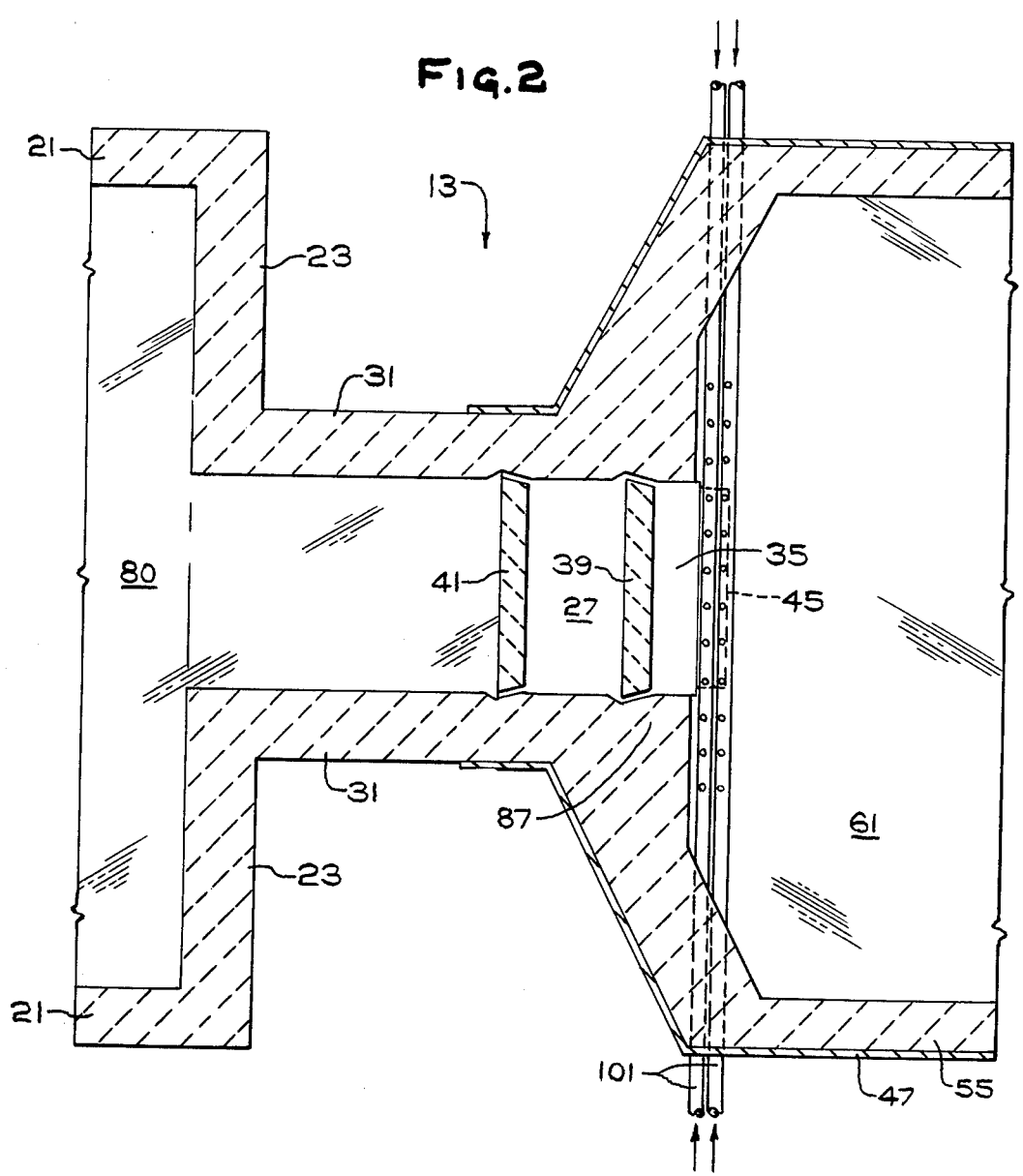
FIG. 2 is a cross-sectional plan of the molten glass delivery facility, glassmaking furnace and glass forming chamber shown in FIG. 1 taken along section line 2—2 of FIG. 1.
Figure 3:
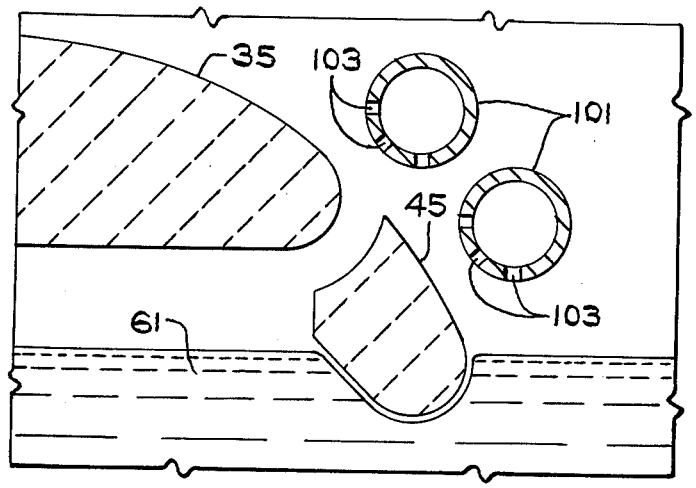
FIG. 3 is a partial cross-sectional, longitudinal elevation of the glass-supporting refractory for delivering molten glass onto molten metal in the forming chamber showing in detail the distributors for establishing curtains of reducing gas across the forming chamber.

Referring to FIGS. 1, 2 and 3, there is shown an apparatus for making flat glass comprising a glassmaking furnace including a refiner or conditioner 11, the discharge end of which is shown, which is connected to a molten glass delivery facility 13 leading to a glass forming chamber 15. The glassmaking furnace 11 includes a furnace bottom 19, side walls 21, including lower, basin wall portions and upper, breast wall portions, a front basin wall 23, and an upper front wall 25 with a crown or roof 26 extending over the top of the furnace from one side wall 21 to the other.

The molten glass delivery facility 13 includes a canal bottom 27 which may be provided with insulation 29 and a casing of metal such as steel plate 30. The facility further includes canal side walls 31 terminating in jambs. These, together with the canal bottom 27, form a channel through which molten glass may flow during operation of the apparatus. The canal may be provided with a supporting cooler 33. The canal bottom 27 terminates with a spout or lip 35 which is mounted above and extends over an entrance or inlet portion of the float forming chamber 15. The molten glass delivery facility 13 further includes a roof or flat arch 37 having openings to receive metering members or tweels. An operating metering member or tweel 39 is mounted transversely across the canal or channel formed between the side walls 31 of the canal. It is mounted in a manner to permit its movement upwardly and downwardly to adjust the size of an opening defined by the bottom of the tweel 39, the sides of the canal 31 and the canal bottom 27 to control the rate of molten glass flow through the canal during operation. Also provided is a backup tweel 41 which is employed as an operating tweel during maintenance on the normal operating tweel 39 and which serves as a shutoff member when the apparatus is not in operation as illustrated in FIG. 1. In the position illustrated in FIG. 1 the backup tweel 41 prevents the flow of molten glass through the molten glass delivery facility 13 to the forming chamber 15. The molten glass delivery facility 13 may optionally include a spout or lip extension 45 in order to provide for fully supporting molten glass until it is delivered onto the surface of molten metal for forming in the forming chamber.

The forming chamber 15 includes a bottom casing 47 and an upper casing 49, which together form an enclosure which may be substantially sealed from the outside environment. Disposed within the bottom casing 47 is a bottom liner 51 and an entrance wall block commonly referred to as a wetback 53 at the entrance or inlet end of the forming chamber beneath the spout or lip 35. The forming chamber further includes side walls 55 which, along with the bottom liner 51, the entrance end block 53 and an exit lip block (not shown), forms a container for containing a pool of molten metal 61, preferably molten tin or an alloy of tin. Prior to heatup the tin is, of course, not molten within the forming chamber. During a heatup procedure, such as carried out in the practice of this invention, the tin or other molten metal is melted to form the pool as illustrated in the drawings. The upper portion of the forming chamber 15 includes an entrance lintel 63 and a refractory roof 65 which extends above and over the pool of molten metal providing an enclosed headspace above the pool of molten metal into which a non-oxidizing gas or gases may be introduced as a protective atmosphere for the pool of molten metal in accordance with known practice. The upper portion of the forming chamber includes a service space 67 above the roof 65. In this space there may be positioned electrical service equipment to service heaters (not shown) mounted in the roof 65. The heaters serve to provide heat to the forming chamber during heatup and following heatup of the forming chamber.

U.S. Pat. No. 3,976,460 is incorporated by reference to illustrate a suitable apparatus for providing heat to the forming chamber in accordance with known practice.

During heatup of the forming chamber and prior to the initiation of molten glass delivery to the forming chamber, the glassmaking furnace is heated and brought to a suitable operating condition so that molten glass is available for delivery to the forming chamber when it has been heated to an appropriate temperature and prepared for receiving molten glass. Therefore, during the practice of the present invention, the glass forming chamber initially contains a pool of molten glass 80 and a pool of molten glass is maintained in the furnace as molten glass is delivered to the forming chamber during the practice of the present invention.

Referring now again to FIGS. 1, 2 and 3, and specifically to FIG. 3, there are shown distributors for distributing reducing gas across the width of the forming chamber entrance in order to purge the entrance region of oxygen and in order to drive any floating dross or metal oxide on the surface of molten metal 61 away from the entrance end of the forming chamber. The distributors 101 each comprise a pipe extending transversely across the entrance or inlet end of the forming chamber. Each pipe is provided with a plurality of openings or orifices 103 aligned along the length of the pipe to provide a plurality of exit openings through which a reducing gas may flow from the interior of the pipes out into the headspace of the entrace or inlet end of the forming chamber. Alternatively, a distributor might be provided with elongated slots or the distributor might be made of a gas permeable material. In any event, a suitable apparatus is provided for receiving a supply of reducing gas and distributing it as a curtain across the forming chamber at its entrance or inlet end. The reducing gas may be preheated to a temperature at or above the temperature above the molten metal at the inlet end of the forming chamber in order to enhance its ability to react with oxygen in the vicinity of the entrance or inlet end of the forming chamber and to purge that region of any residual oxygen.

The illustrated apparatus is prepared for receiving molten glass by applying heat to it in a conventional manner from heaters such as those described in the patent incorporated by reference herein. A non-oxidizing atmosphere is generally provided throughout the service space and headspace of the forming chamber. A curtain of reducing gas, preferably preheated, is directed across the entrance or inlet end of the forming chamber from the openings 103 disposed along the length of the distributors 101 which are mounted across the entrance end of the forming chamber. A distributor is positioned as shown in the downstream or right-hand position of FIGS. 1, 2 and 3 to establish a curtain of reducing gas which impinges upon the metal surface. The backup tweel 41 and then the operating tweel 39 are raised slightly to initiate the flow of molten glass from the pool of molten glass 80 along the canal and over the lip or spout 35 onto the surface of the molten metal 61. As the initially delivered layer of glass passes the distributor 101, the curtain of gas ceases to impinge directly upon the molten metal 61 and impinges upon the glass advancing beneath it. After a body of glass is established along the surface of the pool of molten metal 61 and as it is cooled during its advance to a dimensionally stable, continuous sheet or ribbon of glass and is initially drawn from the chamber, the gas distributor 101 is removed from the forming chamber to terminate the curtain of reducing gas against the glass itself and prevent the continued, direct impingement of gas against the molten glass with any consequent development of defects therein. The flow of gas through the holes 103 of the distributor 101 may be terminated prior to the removal of the distributor 101 from the chamber.

As illustrated in the drawings in accordance with the preferred embodiment of this invention, a second curtain of gas is established between the first curtain of gas which impinges on the molten metal and the metering member 39. Thus, the distributor shown in the upstream or left-hand position of FIGS. 1, 2, and 3 is employed in a manner similar to the use of the downstream distributor to establish such an intermediate curtain of gas which initially blankets the refractory spout or lip 35 and prevents any molten metal or metal oxide particles from spattering onto the spout or lip 35.

Figure 4:
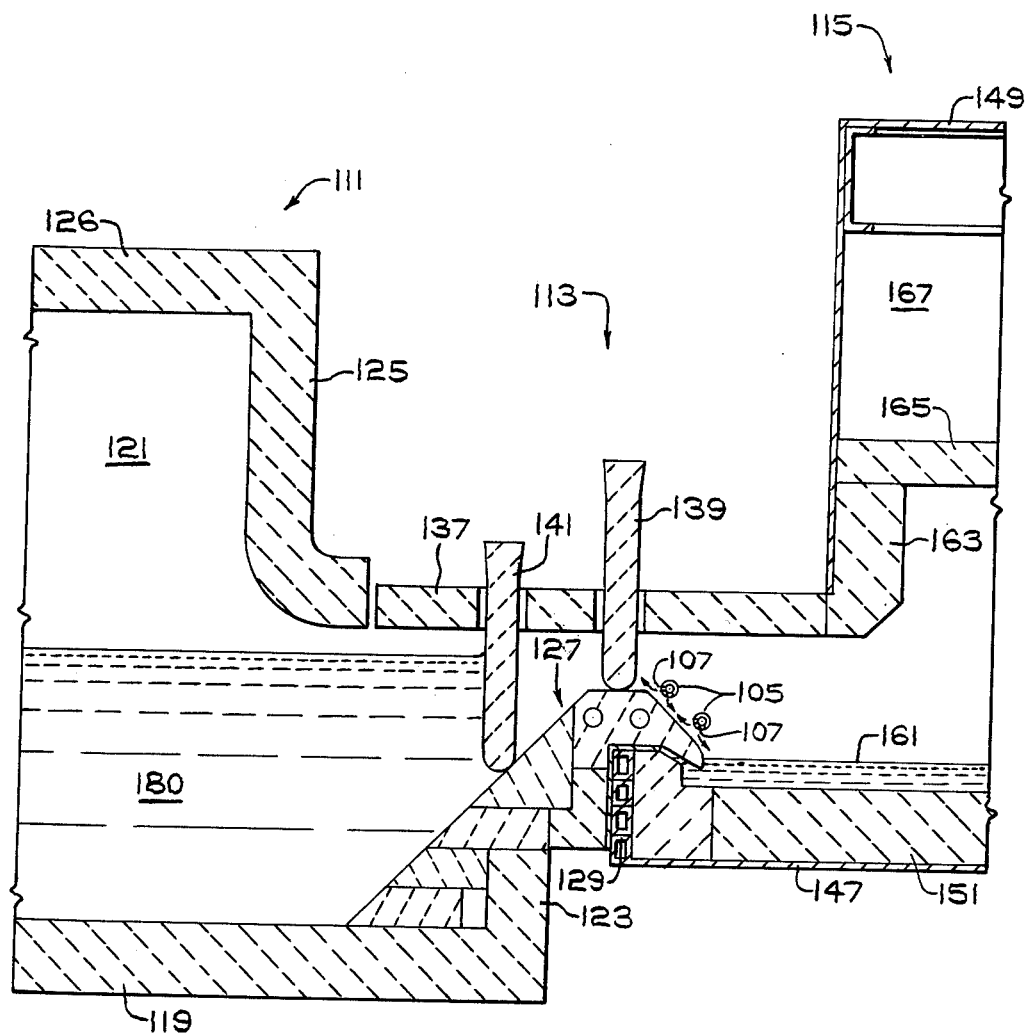
FIG. 4 is a cross-sectional, longitudinal elevation of a molten glass delivery facility joining a glassmaking furnace and a glass forming chamber and illustrating the position of reducing gas distributors for establishing curtains of reducing gas across the entrance end of the forming chamber. As seen with reference to FIGS. 1 and 4, the method of this invention is applicable to differing kinds of forming chamber entrance structures, including those employing a spout or lip for delivering molten glass for forming (FIG. 1) and those employing a threshold for supporting and delivering molten glass for forming (FIG. 4).

Referring now to FIG. 4, there is shown a molten glass delivery facility which employs a threshold assembly rather than a canal with a spout and lip for the delivery of molten glass onto the surface of molten metal for forming in a forming chamber. This apparatus comprises a glassmaking furnace 111 connected through a molten glass delivery facility 113 to a glass forming chamber 115. The glassmaking furnace includes a bottom 119, side walls 121 and a front basin wall 123, along with a suspended front wall 125 and a crown 126 extending between the side walls 121. A refractory threshold assembly 127 forms an upper part of the front basin wall 123 and extends into the forming chamber 115. The threshold assembly includes an internal cooler 129.

The molten glass delivery facility 113, in addition to including the threshold assembly 127, includes a roof or flat arch 137 an operating meter or tweel 139 and a backup meter or tweel 141. As illustrated in FIG. 4, the backup tweel 141 may be positioned in a lowermost position against the upper back face of the threshold 127 to segregate the furnace 111 from the glass forming chamber 115.

The glass forming chamber includes a bottom casing 147 and an upper casing 149 to form an enclosure. Disposed within the bottom casing 147 is a bottom liner 151. The bottom liner 151, along with the threshold assembly 127, side walls and an exit lip (not shown), provides a container for containing a pool of molten metal 161, such as tin. The upper portion of the forming chamber 115 includes an upper front entrance wall 163, a refractory roof 165 and a service space above the roof or ceiling 165. A headspace is provided below the roof 165 and above the pool of molten metal 161 contained within the forming chamber.

Heating means, such as disclosed in the patent incorporated by reference herein, are provided for heating the chamber and means is provided for introducing a non-oxidizing gas into the headspace of the chamber.

Mounted within the entrance or inlet end of the forming chamber, above the threshold assembly 127 are reducing gas distributors 105 having openings 107 in them for distributing a reducing gas into the headspace of the chamber in the vicinity of the threshold assembly 127 and for providing thereby curtains of reducing gas transversely across the entrance or inlet end of the forming chamber. The distributor 105 shown in the downstream or right-hand position of FIG. 4 is positioned for directing a curtain of reducing gas downwardly as shown by the arrow against the metal 161 and in a downstream direction away from the threshold assembly 127. This curtain of gas purges the region of metal oxide or floating dross and serves to cause some wave action at the surface of the molten metal to mix and to purge the region further. The curtain of gas serves to insure that contaminants do not accumulate in the vicinity of the threshold assembly 127 to contaminate its surface and cause defects in glass to be delivered following heatup of the apparatus.

The reducing gas distributor 105 shown in the upstream or lefthand position of FIG. 4 serves to provide a second curtain of reducing gas between the operating tweel 139 and a first curtain of gas which impinges upon the molten metal 161. This intermediate curtain of gas serves to blanket and purge the surface of the refractory threshold assembly and insure its cleanliness when the backup tweel 141 and then the operating tweel 139 are raised sufficiently to permit the flow of molten glass over the threshold assembly and onto the surface of the pool of molten metal 161 in the forming chamber during startup.

Following the initial introduction of molten glass onto the surface of the pool of molten metal 161, and the initial manufacture of a continuous, dimensionally stable ribbon or sheet of glass therefrom, the flow of reducing gas from the distributors 105 is terminated and they are removed from the apparatus in order to permit the glass to be continuously delivered for forming without the direct impingement of any gas against the upper surface of the glass while it is in a condition that would permit it being readily marked due to the impingement of gases against it.

While this invention has been described with reference to particularly preferred embodiments thereof, those skilled in the art of flat glass manufacture will appreciate that variations and modifications of the described embodiments may be made without departing from the spirit or scope of this invention as claimed herein.

We claim:

1. In a method of preparing a glass forming chamber for receiving molten glass onto a pool of molten metal for forming wherein an enclosed chamber having a pool of tin-containing metal therein is heated to melt the metal and is filled with a non-oxidizing atmosphere to prevent the oxidation of the metal and wherein residual oxygen and metal oxide in the vicinity of the chamber immediately adjacent where molten glass is to be delivered thereto contaminates initially delivered glass, the improvement which comprises establishing a curtain of reducing gas transversely across a molten glass inlet end of the glass forming chamber substantially immediately above a molten glass-supporting refractory adjacent the metal onto which molten glass is to be delivered;

maintaining the curtain of reducing gas as the metal is melted and as molten glass is initially delivered onto the molten metal whereby the molten glass is initially delivered onto a molten metal surface having a stream of reducing gas impinging onto it; and thereafter terminating the curtain of reducing gas, preventing the direct impingement of gas against the molten glass.

2. The method according to claim 1 wherein the curtain of reducing gas is directed to impinge upon the molten metal with sufficient force to move any metal oxide floating on the molten metal surface away from the glass-supporting refractory.

3. The method according to claim 1 wherein the reducing gas contains from one to two percent by volume hydrogen.

4. The method according to claim 3 wherein the reducing gas contains nitrogen as its major constituent.

5. The method according to claim 1 wherein the curtain of reducing gas is directed to impinge upon the molten metal with sufficient force to establish a wave action in the molten metal causing molten metal at the surface of the pool to flow away from the glass-supporting refractory.

6. The method according to claim 1 wherein a second curtain of reducing gas is established transversely across the inlet end of the forming chamber with the gas directed to impinge against the glass-supporting refractory and the curtain of reducing gas which impinges onto the molten metal whereby a blanket of reducing gas is maintained over the glass-supporting refractory prior to the delivery of molten glass over it.

* * * * *